J. F. REILLY.
Warming Apparatus.

No. 166,894. Patented Aug. 17, 1875.

Witnesses:
A. B. Robertson
Solon C. Kemon

Inventor.
John F. Reilly
By Munn & Co
Attorneys.

UNITED STATES PATENT OFFICE.

JOHN F. REILLY, OF WASHINGTON, DISTRICT OF COLUMBIA.

IMPROVEMENT IN WARMING APPARATUS.

Specification forming part of Letters Patent No. 166,894, dated August 17, 1875; application filed May 21, 1875.

*To all whom it may concern:*

Be it known that I, JOHN F. REILLY, of Washington city, District of Columbia, have invented a new and Improved Warming Apparatus; and I do hereby declare that the following is a full, clear, and exact description of the same, reference being had to the accompanying drawing, forming a part of this specification.

My invention relates to certain improvements in that class of devices used for cooking and warming, by steam, meats, vegetables, &c.

The invention will first be described in connection with drawing, and then pointed out in the claim.

Figure 1:
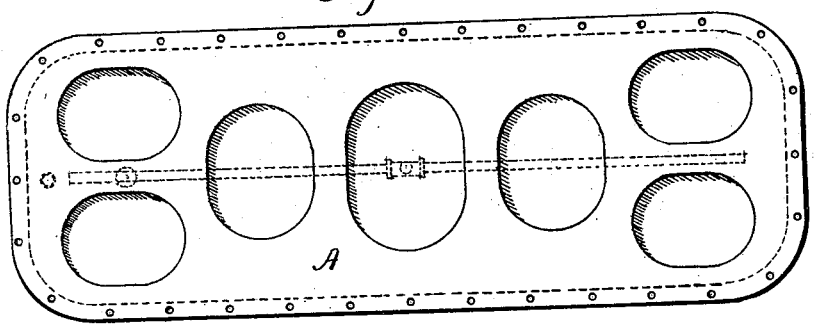
Figure 2:
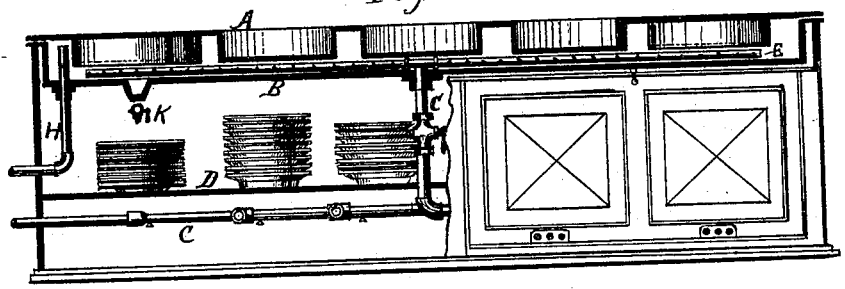
Figure 3:
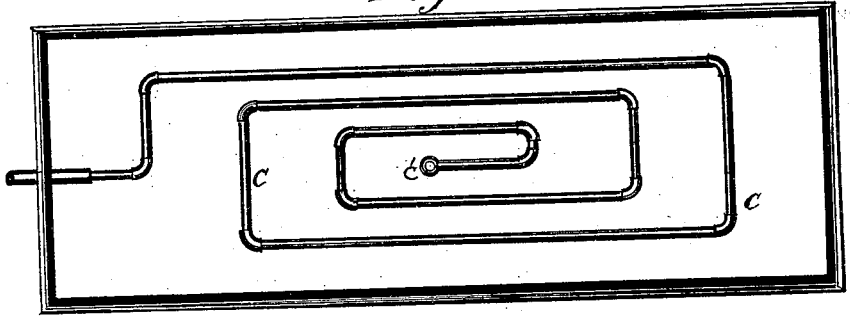

Figure 1 represents a plan view, looking down on the apparatus. Fig. 2 represents a view in elevation, the front partly cut away, so as to show a view of the interior; and Fig. 3, a horizontal section, showing the arrangement of the heating-pipe C where it enters the cabinet containing the heating-pan.

The cover A of the pan is of iron, cast in one piece, containing the several cavities suitable to the variously-sized dishes. This cover is firmly and tightly bolted by a steam-joint to the pan B, which is also of cast-iron. I introduce the steam through the coil C, beneath a shelf, D, on which plates are placed to be warmed, and up through the pan, and thence, as shown in the drawing, through a perforated pipe, E. The steam, condensing, will form into water, and rise in the pan until it reaches the overflow-pipe H. I provide a cock to drain the pan entirely, should it be necessary, and a pipe attached to this cock, which carries the water off to a drain.

I have recently applied my apparatus to steamboat-pantries, and find it works with great satisfaction; but it is also applicable for steaming and heating food for hotels, restaurants, &c.

The great advantage of my apparatus over all others is, that I bring live steam. at a high pressure, in close contact with the food, and at the same time have a perfectly steam-tight, durable, and strong steamer conveniently and compactly arranged.

I am aware that steam has been used for like heating purposes; but

Having thus described my invention, what I claim as new is—

The combination, with cover A and pan B, of the intermediate longitudinal perforated steam-pipe E and the overflow-pipe H, arranged substantially as and for the purpose described.

JOHN F. REILLY.

Witnesses:
W. J. BABCOCK,
JAS. N. CALLAN.